(12) United States Patent
Mazzini et al.

(10) Patent No.: US 11,296,791 B1
(45) Date of Patent: Apr. 5, 2022

(54) AUTO-TUNEABLE OPTICAL TRANSCEIVER MODULES

(71) Applicant: Cisco Technology, Inc., San Jose, CA (US)

(72) Inventors: Marco Mazzini, Seville (ES); Alberto Cervasio, Cuorgne' (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/062,289

(22) Filed: Oct. 2, 2020

(51) Int. Cl.
*H04B 10/40* (2013.01)
*G02B 6/293* (2006.01)

(52) U.S. Cl.
CPC ......... *H04B 10/40* (2013.01); *G02B 6/29302* (2013.01)

(58) Field of Classification Search
CPC .... H04B 10/40; H04B 10/674; H04B 10/564; G02B 6/29302
USPC ......................................................... 398/135
See application file for complete search history.

(56) References Cited

U.S. PATENT DOCUMENTS

| | | | | |
|---|---|---|---|---|
| 5,923,450 A * | 7/1999 | Dugan | ............... | H04B 10/2971 398/95 |
| 6,931,196 B2 * | 8/2005 | Livas | ................... | H04B 10/077 359/337.1 |
| 7,251,410 B2 | 7/2007 | Ide | | |
| 7,697,842 B2 | 4/2010 | Young et al. | | |
| 8,064,769 B2 | 11/2011 | Galli et al. | | |
| 8,923,700 B2 | 12/2014 | Socci et al. | | |
| 9,621,261 B2 * | 4/2017 | Clouet | ............... | H04B 10/0775 |
| 10,615,905 B2 | 4/2020 | DeAndrea | | |
| 2003/0223728 A1 * | 12/2003 | Maeda | ............... | H04B 10/2931 385/140 |
| 2004/0109685 A1 * | 6/2004 | Wan | ..................... | H04J 14/0221 398/41 |
| 2006/0093362 A1 * | 5/2006 | Welch | ................ | G02B 6/12026 398/87 |
| 2007/0230959 A1 * | 10/2007 | Kamioka | ............. | H04B 10/506 398/79 |
| 2014/0079385 A1 * | 3/2014 | Shukunami | .......... | H04B 10/564 398/16 |

* cited by examiner

*Primary Examiner* — Dalzid E Singh
(74) *Attorney, Agent, or Firm* — Patterson + Sheridan, LLP (57) ABSTRACT

Techniques for tuning an optical communication system are disclosed. The system includes a first signal path for transmitting data, including an optical source, a first one or more variable optical attenuators (VOAs), a modulator, and a transmission fiber. The system further includes a second signal path for receiving data, including a receiver fiber and a second one more VOAs. The first one or more VOAs are tuned using the optical source in the first signal path for transmitting data, based on comparing a plurality of optical signal power values in the first path while a first tuning mode is enabled. The second one or more VOAs are tuned, using the optical source in the first signal path for transmitting data, based on comparing a plurality of optical signal power values in the second path while a second tuning mode is enabled.

20 Claims, 8 Drawing Sheets

AUTO-TUNEABLE OPTICAL TRANSCEIVER MODULES

TECHNICAL FIELD

Embodiments presented in this disclosure generally relate to electronic communications. More specifically, embodiments disclosed herein relate to fiber optic communications.

BACKGROUND

Many modern fiber optic communication systems use silicon photonic (SIP) technology and pulse amplitude modulation (PAM). For example, 4-level PAM (PAM4) modulation can be used to transmit data across an optical system. Fiber optic communication systems can modulate optical signals using Mach-Zehnder Delay-Interferometer (MZDI) based modulators. Further, variable optical attenuators (VOAs) can be used on both the transmitter and receiver sides of the system to control output and input power, respectively, and improve performance. These VOAs are typically calibrated and tuned to improve performance and accuracy of the system. This can be done manually using a test bench, for example.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments include a method. The method includes enabling a first tuning mode for an optical communication system. The optical communication system includes a first signal path for transmitting data. The first signal path includes an optical source, a first one or more variable optical attenuators (VOAs), a modulator, and a transmission fiber. The optical communication system further includes a second signal path for receiving data. The second signal path includes a receiver fiber and a second one more VOAs. The method further includes tuning the first one or more VOAs, using the optical source in the first signal path for transmitting data, based on comparing a plurality of optical signal power values in the first path while the first tuning mode is enabled. The method further includes enabling a second tuning mode for the optical communication system. The method further includes tuning the second one or more VOAs, using the optical source in the first signal path for transmitting data, based on comparing a plurality of optical signal power values in the second path while the second tuning mode is enabled. The method further includes enabling a communication mode, in which the optical communication system is configured to use the first signal path for transmitting data and the second signal path for receiving data.

Embodiments further include an optical communication system, including a first signal path for transmitting data. The first signal path includes an optical source, a first one or more VOAs, a modulator, and a transmission fiber. The optical communication system further includes a second signal path for receiving data. The second signal path includes a receiver fiber, and a second one more VOAs. The optical communication system is configured to enable a first tuning mode for tuning the first one or more VOAs, using the optical source in the first signal path for transmitting data, based on comparing a plurality of optical signal power values in the first path while the first tuning mode is enabled. The optical communication system is further configured to enable a second tuning mode for tuning the second one or more VOAs, using the optical source in the first signal path for transmitting data, based on comparing a plurality of optical signal power values in the second path while the second tuning mode is enabled. The optical communication system is further configured to enable a communication mode, in which the optical communication system is configured to use the first signal path for transmitting data and the second signal path for receiving data.

Embodiments further include a method. The method includes transmitting data using a first signal path in an optical communication system. The first signal path includes an optical source, a first one or more VOAs, a modulator, and a transmission fiber. The method further includes receiving data using a second signal path in the optical communication system, the second signal path including a receiver fiber, and a second one more VOAs. The first one or more VOAs are configured to be tuned, using the optical source in the first signal path, based on comparing a plurality of optical signal power values in the first path while a first tuning mode is enabled. The second one or more VOAs are configured to be tuned, using the optical source in the first signal path, based on comparing a plurality of optical signal power values in the second path while a second tuning mode is enabled.

Example Embodiments

As discussed above, many SiP based fiber optic communication systems use MZDI modulators with variable optical attenuators (VOAs) to transmit data (e.g., using 4-level pulse amplitude modulation (PAM4) modulation). To improve performance, several different characteristics can be tuned. For example, the MZDI modulator can be tuned so that its bias point is set to the quadrature point, where the modulator characteristics are linear. Further, the swing of the modulated signal can be optimized (e.g., based on the depth of the radio frequency (RF) modulation).

The VOAs can also be tuned, both on the transmitter side and the receiver side. As discussed further below with regard to FIG. 1, the transmitter-side VOA can be used to control the modulator output power (e.g., allowing attenuation of the output power without setting the laser too low, which can cause mode-hop issues). The receiver-side VOA can be used to control the receiver input power, in order to avoid saturating later stages when too much input power is present. These VOAs can be separately tuned to provide appropriate relative attenuation on each side.

As discussed above, these VOAs can be tuned manually (e.g., during manufacturing) using a test bench. This is discussed further below with regard to FIG. 2. According to one or more embodiments disclosed herein, these VOAs can also be tuned without requiring external equipment. For example, as discussed below with regard to FIG. 3, an optical system can be setup to provide automatic tuning for transmission side and receiver side components by, for example, toggling one or more optical switches between optical signal paths, and using components already in the system. This tuning can be done without external equipment (e.g., without requiring a test bench). Further, as will be discussed further below with regard to FIGS. 7 and 8, setting a PAM4 modulation scheme to use bottom-compression can further improve system performance by improving the return loss robustness of the system. The tuning techniques described in connection with FIGS. 3-6 can be used to tune an optical communication system to use bottom-compression in modulation.

Figure 1:
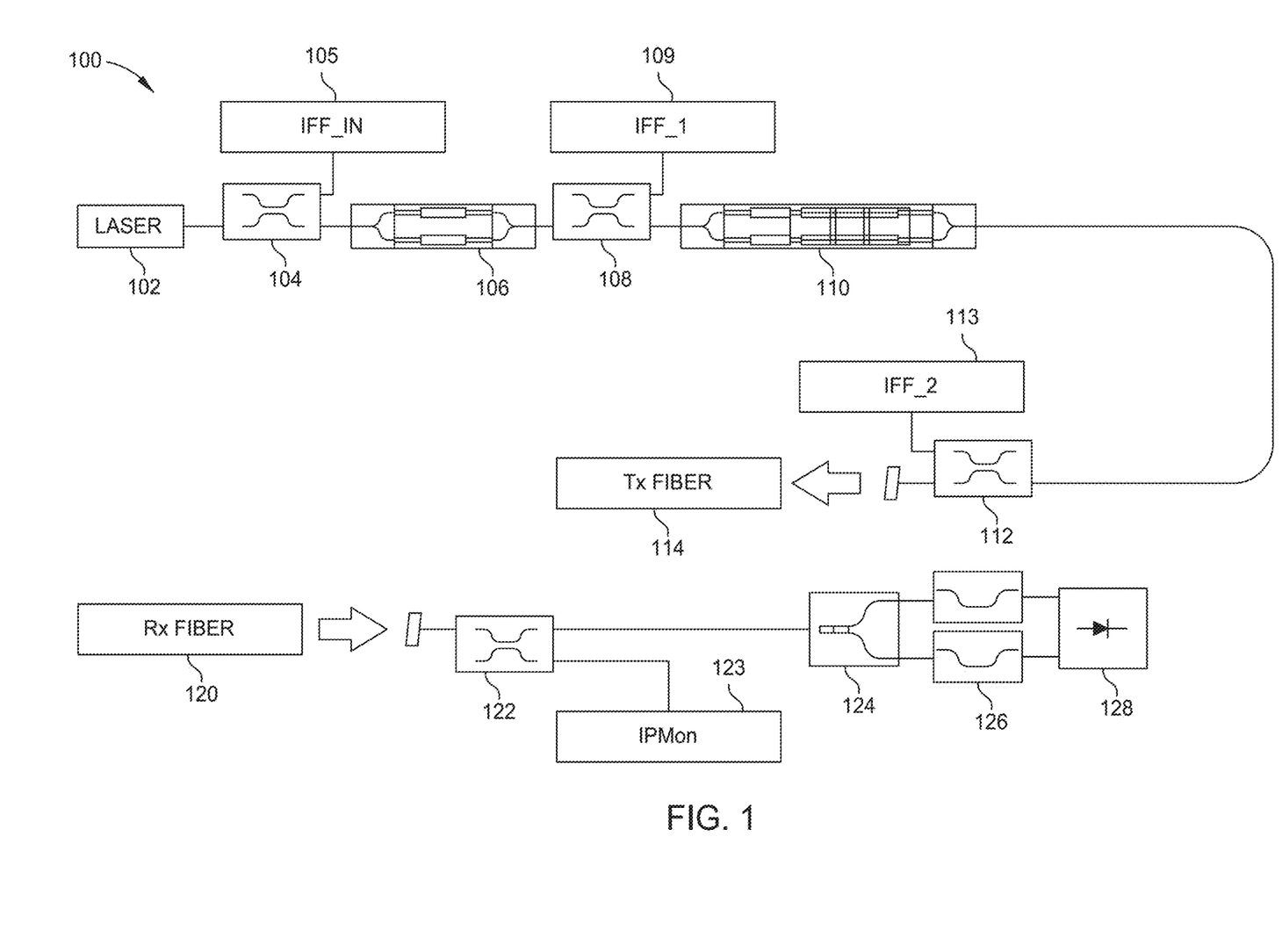
FIG. 1 illustrates an optical signal path for an example optical communication system, according to an embodiment.

FIG. 1 illustrates an optical signal path for an example optical communication system 100, according to an embodiment. A laser 102 emits an optical signal. In an embodiment, any suitable laser for an optical communication system can be used (e.g., a distributed feedback laser (DFB)). Further, in an embodiment, a laser is merely one example of an optical source. Any suitable optical source could be used. A coupler 104 receives the optical signal and divides the signal between a VOA 106 and a monitor 105 (e.g., an electro-optical monitoring device, or any other suitable monitoring device) that generates a signal IFF_IN (e.g., an electrical signal). In an embodiment, IFF_IN indicates the power of the optical signal transmitted by the laser 102.

The VOA 106 attenuates the optical signal and transmits it to a coupler 108. In an embodiment, the VOA 106 is used to attenuate the signal to avoid setting the output of the laser 102 below a desired level. For example, setting the laser 102 such that it generates an optical signal whose power is below an output threshold can result in undesirable noise or mode hopping. Using the VOA 106 allows the laser 102 to operate above a preferred range, while still controlling the transmission power of the optical signal as it propagates through the system.

The coupler 108 divides the signal between a modulator 110 and a monitor 109 that generates a signal IFF_1 (e.g., an electrical signal). In an embodiment, IFF_1 indicates the power of the optical signal after it has been attenuated by the VOA 106. By comparing the signals IFF_IN and IFF_1, one can determine the level of attenuation from the VOA 106.

In an embodiment, the modulator 110 modulates the optical signal to add data for transmission along a fiber. In an embodiment, the modulator 110 is an MZDI based modulator that implements PAM4 modulation. These are merely examples, however, and any suitable modulator and modulation scheme can be used.

The modulator 110 transmits the signal to a coupler 112, which divides the signal between a transmission fiber 114 and a monitor 113 that generates a signal IFF_2 (e.g., an electrical signal). In an embodiment, IFF_2 indicates the power of the optical signal after it has been modulated by the modulator 110. In an embodiment, the modulator 110 can introduce a small signal loss. The coupler 112 transmits the signal to the transmission fiber 114 using any suitable coupling technique. In an embodiment, the optical signal then travels toward its destination using the transmission fiber 114. Further, in an embodiment, a silicon chip containing the optical components 104-112 can end after the coupler 112 and can transmit the optical signal to a customer transmission fiber 114.

A receiver fiber 120 carries an optical signal (e.g., the optical signal transmitted through the transmission fiber 114). For example, the receiver fiber 120 could be the other side of an optical system in which a signal is transmitted from a source, using transmission fiber 114, to a destination where it is received using receiver fiber 120. The receiver fiber 120 provides the signal to a coupler 122 (e.g., using a prong coupler or any other suitable coupling technique). The coupler 122 divides the signal between a polarization splitter 124 and a monitor 123 that generates a signal IPMon (e.g., an electrical signal). In an embodiment, the signal IPMon indicates the power of the optical signal received from the receiver fiber 120.

The polarization splitter 124 transmits the signal to a VOA 126. In an embodiment, the VOA 126 attenuates the different polarization components of the signal differently, after the signal has been split by the polarization splitter. The VOA 126 transmits the signal to a receiver 128 (e.g., a photodiode) where the optical power of the signal is detected and converted in an electrical signal.

In an embodiment, the VOA on the transmitter side (e.g., the VOA 106 illustrated in FIG. 1) and the VOA on the receiver side (e.g., the VOA 126 illustrated in FIG. 1) are each tuned. For example, the VOA 106 can be calibrated based on the relative power difference between the signals IFF_IN, IFF_1, and IFF_2. Comparing IFF_IN with IFF_1 captures the attenuation provided by the VOA 106. Comparing IFF_1 with IFF_2 captures any signal loss provided by the modulator 110. In an embodiment, the VOA 106 can be tuned based on both comparisons, to provide desired attenuation of the input optical signal from the laser 102 while also taking into account signal loss from the modulator 110.

The VOA 126 can be tuned based on the relative power difference between the signal IPMon and the signal generated by the receiver 128. In an embodiment, the VOAs 106 and 126 can be tuned manually using an external test bench, as described in relation to FIG. 2 below. Alternatively, or in addition, the VOAs 106 and 126 can be tuned automatically without using an external test bench, as described in relation to FIGS. 3-6, below. FIG. 1 illustrates one example of an optical communication system. Any suitable optical communication system can be used.

Figure 2:
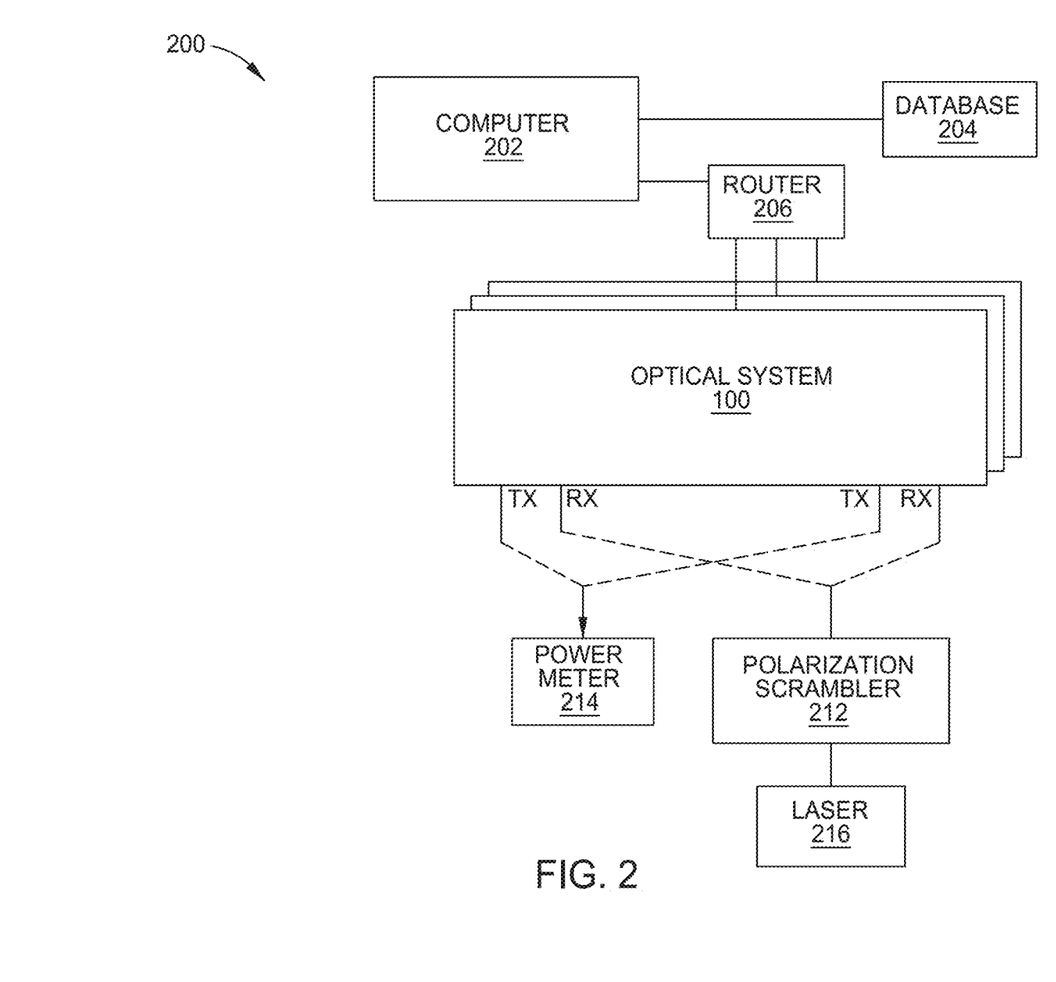
FIG. 2 illustrates a testing system for an example optical communication system, according to an embodiment.

FIG. 2 illustrates a testing system 200 for an example optical communication system, according to an embodiment. Starting with the transmission side, transmission modules (e.g., the modulator 110 and the VOA 106 illustrated in FIG. 1) can be tuned using the power meter 214. A laser in the optical communication system 100 is turned on (e.g., the laser 102 illustrated in FIG. 1). The laser bias is set to a constant value (e.g., IFF_IN illustrated in FIG. 1). A modulator (e.g., the modulator 110 illustrated in FIG. 1) is swept for quadrature. In an embodiment, the computer 202 and database 204 are used to set the bias values for the modulator.

A transmission side VOA (e.g., the VOA 106 illustrated in FIG. 1) is swept across a suitable range of attenuation values (e.g., in increments of 0.5 dB granularity). In an embodiment, the computer 202 and database 204 are used to set the values for the transmission side VOA. The various IFF signal values in the optical system, the laser bias used to match quadrature, and the power received at the power meter 214 are measured to generate a table of suitable values to tune the modulator and the transmission side VOA. In an embodiment, the table of tuned values (e.g., for operating the modulator and the transmission side VOA) is stored in the database 204 for use in production systems and is stored in the optical system which will use them during operations. Alternatively, or in addition, the transmission side VOA (and other components) can be tuned using any other suitable algorithm.

Similarly, receiver side modules (e.g., the receiver VOA 126 illustrated in FIG. 1) can be tuned using an external laser 216 and a polarization scrambler 212. For example, the external laser 216 and the polarization scrambler 212 can be turned on. In an embodiment, as discussed further below, the receiver side components operate with an indeterminate polarization. For example, the receiver side is compatible with on a variety of polarization values. The polarization scrambler 212 can scramble the polarization of the signal output by the external laser 216, to allow tuning of the polarization paths in the VOA (e.g., across possible polarization values). The VOA 126 can be swept across a range of attenuation values (e.g., in 0.5 dB increments) along the polarization paths (e.g., using the computer 202 and the database 204).

The insertion loss can be calibrated based on measuring IPMon and received signal strength (RSSI) (e.g., at receiver 128 illustrated in FIG. 1). In an embodiment, tuning values are stored in the database 204 for eventual use in production systems and is stored in the optical system which will use them during operations. Further, in an embodiment, the testing system 200 can be used to tune multiple modules in a serial fashion by switching between inputs and outputs for the different modules (e.g., using the router 206).

As illustrated, the testing system 200 can be used to tune the various components of the optical system. It uses, however, numerous external components for tuning, including the power meter 214, the external laser 216, and the polarization scrambler 212. Further, the external components are operated manually to tune the transmitter side modulator and VOA and receiver side VOA (e.g., an engineer operates the external components for fiber management). This can be inefficient, expensive, and time-consuming. In an embodiment, FIGS. 3-6 illustrate an example automated solution for tuning the VOAs.

Figure 3:
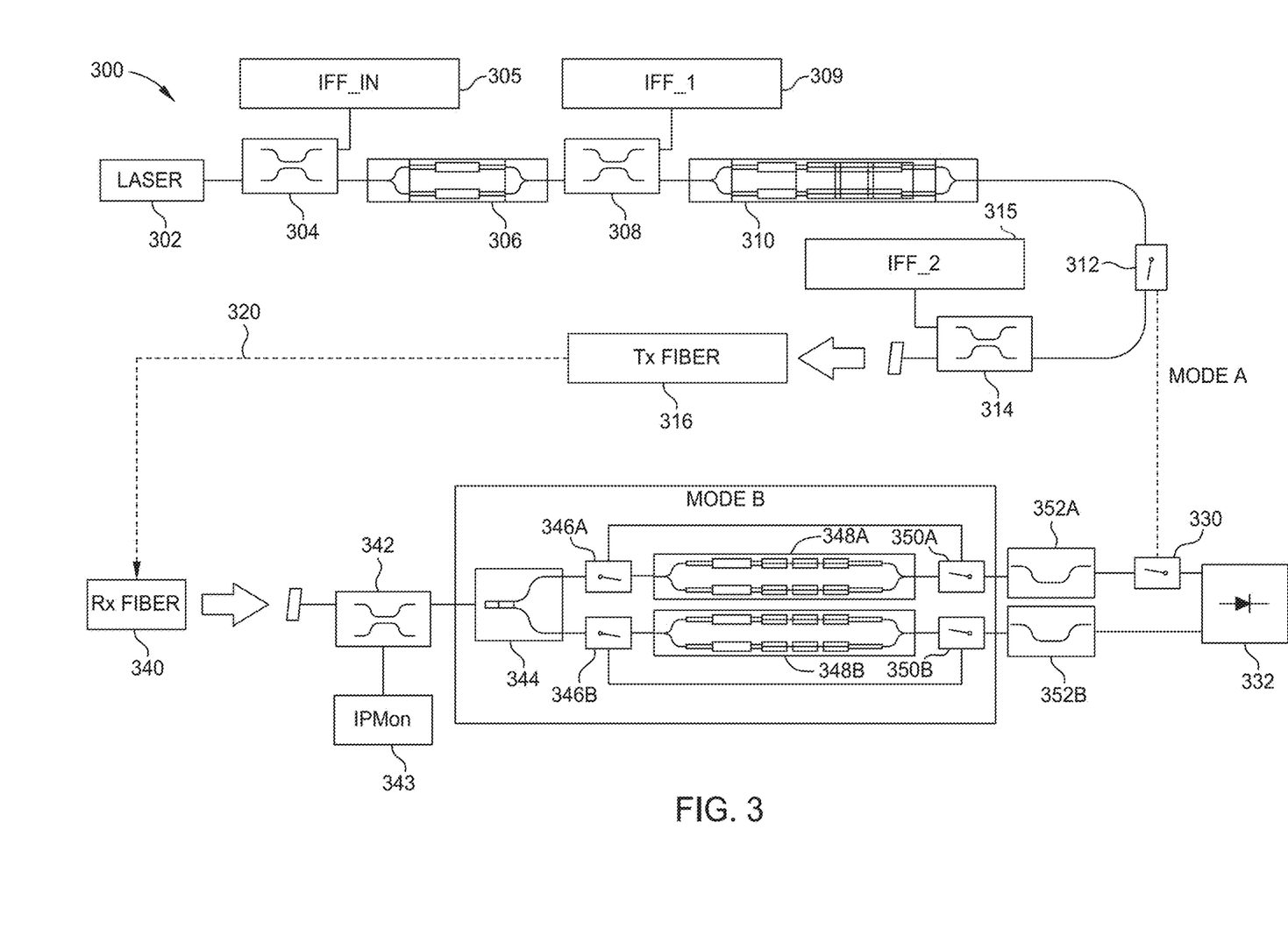
FIG. 3 illustrates auto-tuning for an example optical communication system, according to an embodiment.

FIG. 3 illustrates auto-tuning for an example optical communication system 300, according to an embodiment. In an embodiment, FIG. 3 enables normal transmission of an optical signal (e.g., from a laser 302 to a transmission fiber 316) and normal receipt of an optical signal (e.g., from a receiver fiber 340) in a manner similar to the optical communication system 100 illustrated in FIG. 1. FIG. 3 also, however, enables auto-tuning of a modulator (e.g., a modulator 310), a transmission VOA (e.g., a VOA 306) and receiver VOAs (e.g., VOAs 352A and 352B). In an embodiment, a pair of optical switches 312 and 330 are used to select the optical signal path of the optical signal and to switch between normal transmission, tuning of the transmission side components (e.g., Mode A), and tuning of the receiver side components (e.g., Mode B).

A laser 302 emits an optical signal. In an embodiment, any suitable laser for an optical communication system can be used (e.g., a distributed feedback laser (DFB)). Further, in an embodiment, a laser is merely one example of an optical source. Any suitable optical source could be used. A coupler 304 receives the optical signal and divides the signal between a VOA 306 and a monitor 305 (e.g., an electro-optical monitoring device, or any other suitable monitoring device) that generates a signal IFF_IN (e.g., an electrical signal). In an embodiment, IFF_IN indicates the power of the optical signal transmitted by the laser 302.

The VOA attenuates the signal and transmits it to a coupler 308. The coupler 308 divides the signal between a modulator 310 and a monitor 309 that generates a signal IFF_1 (e.g., an electrical signal). In an embodiment, IFF_1 indicates the power of the optical signal after it has been attenuated by the VOA 306. By comparing the signals IFF_IN and IFF_1, one can determine the level of attenuation from the VOA 306.

In an embodiment, the modulator 310 modulates the optical signal to add data for transmission along a fiber. In an embodiment, the modulator 310 is an MZDI based modulator that implements PAM4 modulation. These are merely examples, however, and any suitable modulator and modulation scheme can be used.

The modulator 310 transmits the signal to an optical switch 312. In an embodiment, the optical switch 312 can be used to swap between an auto-tuning mode for the VOA 306 and normal transmission. Assuming the optical switch 312 is set for normal transmission, the modulator 310 transmits the optical signal to a coupler 314. The coupler 314 divides the signal between a transmission fiber 316 and a monitor 315 that generates a signal IFF_2 (e.g., an electrical signal). In an embodiment, IFF_2 indicates the power of the optical signal after it has been modulated by the modulator 310. The coupler 314 can transmit the signal to the transmission fiber 316 using any suitable coupling technique. In an embodiment, the optical signal then travels to its destination using the transmission fiber 316.

Returning to the optical switch 312, assume the optical switch is instead set to enable auto-tuning mode (i.e., Mode A) for the transmission side components (e.g., the modulator 310 and the VOA 306). The modulator 310 transmits the optical signal to the optical switch 330, via the optical switch 312, instead of to the coupler 314. In an embodiment, the optical switch 330 is used to allow the receiver device 332 (e.g., a photo-diode) to be used both for tuning the transmission VOA (e.g., in Mode A) and the receiver VOAs (e.g., in Mode B). Assuming the optical switches 312 and 330 are both set to enable Mode A (e.g., auto-tuning of the transmission side components), the modulator 310 transmits the optical signal to the receiver device 332, bypassing the components to the left of the optical switch 330.

The receiver device 332 is used to tune the transmission VOA 306 and any signal loss introduced by the modulator 310. Further, the modulator 310 can be tuned so that its bias point is set to the quadrature point, where the modulator characteristics are linear. In an embodiment, the receiver device 332 acts in place of the power meter 214 illustrated in FIG. 2.

The optical communication system 300 can further be used to tune the receiver side VOAs 352A and 352B. In an embodiment, this is done by switching from Mode A to Mode B. The optical switch 312 can be changed to transmit the signal from the modulator 310 to the coupler 314 and the transmission fiber 316. A loopback cable 320 can be used to connect the transmission fiber 316 with a receiver fiber 340, for tuning of the VOAs 352A and 352B. This allows the laser 302 to be used as a source for this tuning (e.g.; instead of requiring an external laser, like the external laser 216 illustrated in FIG. 2).

The receiver fiber 340 provides the signal to a coupler 342 (e.g., using a prong coupler or any other suitable coupling technique). The coupler 342 divides the signal between a polarization splitter 344 and a monitor 343 that generates a signal IPMon (e.g., an electrical signal). In an embodiment, the signal IPMon indicates the power of the optical signal received from the receiver fiber 340.

In an embodiment, the optical signal received from the receiver fiber 340 has an unknown polarization. For example, the optical signal can include a combination of transverse electric (TE) polarization and transverse magnetic (TM) polarization, but the orientation of these components (and of the signal as a whole) is unknown. The VOA 352A can be used to attenuate signal components with one polarization (e.g., TE) while the VOA 352B can be used to attenuate signal components with another polarization (e.g., TM), Because the combined received signal polarization is unknown, in one embodiment the VOAs 352A-B are tuned across the possible polarizations.

The coupler 342 transmits the optical signal to a polarization splitter 344. The polarization splitter 344 divides the signal into polarization components (e.g., TE and TM). One polarization component is sent along the upper path (e.g., 346A to 348A to 350A to 352A) while the other polarization component is sent along the lower path (e.g., 346B to 348B to 350B to 352B).

In an embodiment, the optical switches 346A and 346B and 350A and 350B can be used to select which polarization component to tune, or to bypass the tuning completely. For example, assume the polarization splitter 344 sends the TE polarization component to the optical switch 346A. The optical switches 346A and 350A can either transmit the TE polarization component to a polarization rotator 348A, for tuning the VOA 352A, or can transmit the TE polarization component to the VOA 352A and bypass the polarization rotator 348A. Similarly, assuming the polarization splitter 344 transmits the TM polarization to the optical switch 346B, the optical switches 346B and 350B can be used to either transmit the TM polarization component to a polarization rotator 348B, for tuning the VOA 352B, or can transmit the TM polarization component to the VOA 352B and bypass the polarization rotator 348B.

In an embodiment, the polarization rotators 348A and 348B are used to rotate the polarization components to mimic any possible polarization of the optical signal, to allow for tuning of the VOAs 352A and 352B. For example, assume the optical switches 346A and 350A are engaged to transmit the TE polarization from the polarization splitter 344 to the polarization rotator 348A. During tuning, the polarization rotator 348A can be swept across possible polarization orientations, to allow for accurate tuning across a large number of possible input polarizations.

Similarly, assume the optical switches 346B and 350B are engaged to transmit the TM polarization from the polarization splitter 344 to the polarization rotator 348B. During tuning, the polarization rotator 348B can be swept across possible polarization orientations. The polarization rotators 348A and 348B can be used in place of an external polarization scrambler (e.g., the polarization scrambler 212 illustrated in FIG. 2). The relative signal power value at the receiver device 332 can be compared with IPMon to tune the VOAs 352A and 352B. Further, optical switches 346A and 346B, and 350A and 350B, can be set to bypass the respective polarization rotators 348A and 348B, allowing for signal transmission without tuning.

The optical communication system 300 illustrated in FIG. 3 is merely one example of a system for auto-tuning of transmission side components and a receiver side VOA. Other suitable configurations and components can be used for auto-tuning of the modulator VOAs. For example, one or more of the techniques described herein for auto-tuning could be applied to a coherent optical system, or any other suitable optical communication system.

Figure 4:
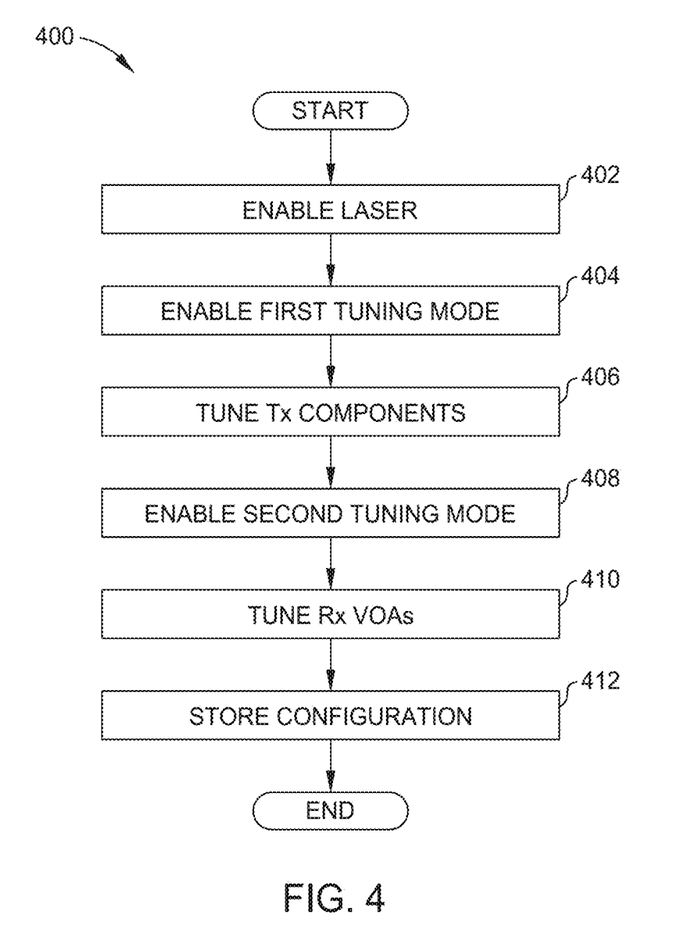
FIG. 4 is a flowchart illustrating auto-tuning for an example optical communication system, according to an embodiment.

FIG. 4 is a flowchart 400 illustrating auto-tuning for an example optical communication system, according to an embodiment. In an embodiment, the blocks illustrated in FIG. 4 correspond with a process for auto-tuning an optical communication system (e.g., the optical communication system 300 illustrated in FIG. 3). At block 402, the process enables a laser (e.g., the laser 302 illustrated in FIG. 3) to initiate transmission of an optical signal.

At block 404, the process enables a first tuning mode (e.g., Mode A illustrated in FIG. 3). For example, in the example optical communication system 300 illustrated in FIG. 3, an optical switch 312 can be set to transmit from a modulator 310 to a second optical switch 330, instead of to a coupler 314 and transmission fiber 316. Similarly, an optical switch 330 can be set to transmit to a receiver device 332 (e.g., a photodiode).

At block 406, the process tunes the transmission side components (e.g., the VOA 306 and modulator 310 illustrated in FIG. 3). As an example, the process can tune an MZDI modulator so that its bias point is set to the quadrature point. This is discussed further with regard to FIG. 5, below.

At block 408, the process enables a second tuning mode (e.g., Mode B illustrated in FIG. 3). For example, the optical switch 312 can be set to transmit the optical signal from the modulator 310 to the coupler 314 and the transmission fiber 316 (e.g., for normal operation of the transmission side of the optical system). Similarly, the optical switch 330 can be set to transmit the optical signal from the VOAs 352A and 352B to the receiver device 332. Further, a loopback cable 320 can be used to transmit an optical signal from the transmission fiber 316 to the receiver fiber 340.

At block 410, the process tunes the receiver side VOAs (e.g., the VOAs 352A and 352B illustrated in FIG. 3). For example, the system compares the relative signal power value at IPMon and 332 to tune the VOAs 352A and 352B (e.g., to set a table of attenuation values for use by the VOAs 352A and 352B). This is discussed further with regard to FIG. 6, below.

At block 412, the process stores the tuning configuration (e.g., for the modulator 310 and the VOAs 306, 352A, and 352B). In an embodiment, the process stores attenuation values corresponding to each of the VOAs in a table, for use during operation of the system. The table can be stored in non-volatile memory, or any other suitable non-volatile media, and can be stored locally in a controller, remotely, or any other suitable location for use in the optical communication system.

Figure 5:
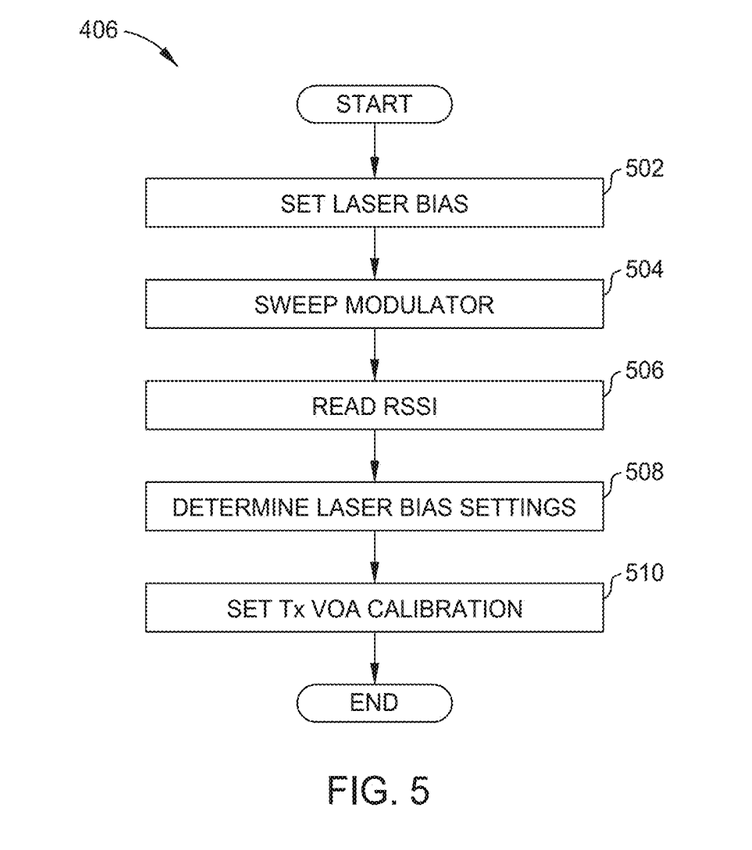
FIG. 5 is a flowchart illustrating tuning transmission side components for an example optical communication system, according to an embodiment.

FIG. 5 is a flowchart illustrating tuning transmission side components for an example optical communication system, according to an embodiment. In an embodiment, FIG. 5 corresponds with block 406 illustrated in FIG. 4. Further, as discussed above in relation to block 404, a first tuning mode (e.g., Mode A illustrated in FIG. 3) has been enabled. At block 502, a process (e.g., the one driving the optical communication system 300 illustrated in FIG. 3) sets the laser bias (e.g., for the laser 302 illustrated in FIG. 3) to constant value (e.g., to set a constant IFF_1). At block 504, the process sweeps the modulator (e.g., the modulator 310 illustrated in FIG. 3) and sets the value to quadrature.

At block 506, the system reads the received signal strength indication (RSSI) (e.g., at the receiver device 332 illustrated in FIG. 3). At block 508, the process determines the laser bias settings to use in operation. At block 510, the process sets the calibration for the transmission VOA (e.g., the VOA 306 illustrated in FIG. 3). For example, the process can compare the RSSI at the receiver device 332 with IFF_1 to set an attenuation table for the VOA 306. In an embodiment, the system stores the tuning values (e.g., the laser bias settings for the modulator 310 and the attenuation settings for the VOA 306 illustrated in FIG. 3).

Figure 6:
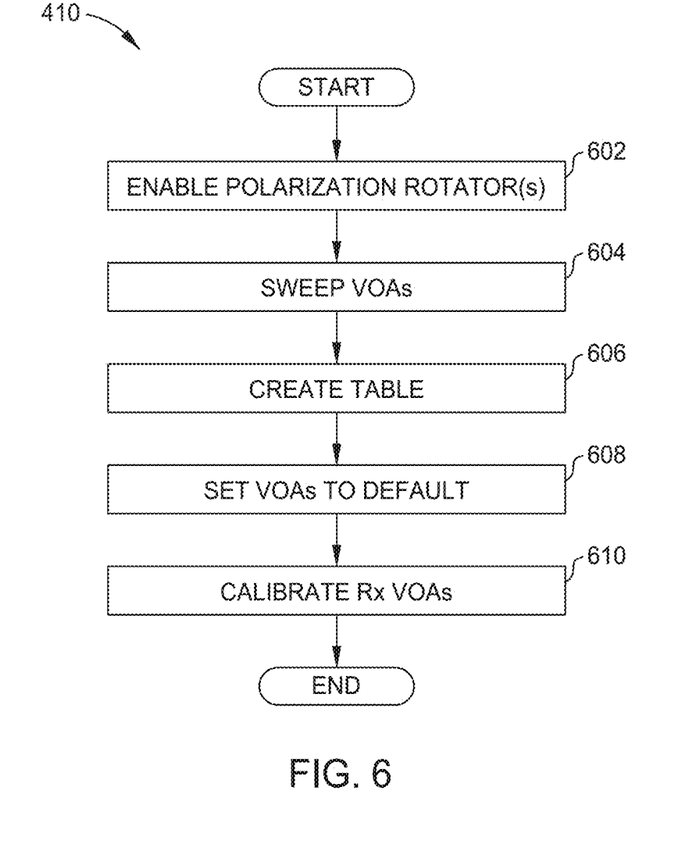
FIG. 6 is a flowchart illustrating tuning receiver side components for an example optical communication system, according to an embodiment.

FIG. 6 is a flowchart illustrating tuning receiver side components for an example optical communication system, according to an embodiment. In an embodiment, FIG. 6 corresponds with block 410 illustrated in FIG. 4. Further, as discussed above in relation to block 408, a second tuning mode (e.g., Mode B illustrated in FIG. 3) has been enabled. At block 602 the process enables the polarization rotators (e.g., the polarization rotators 348A and 348B illustrated in FIG. 3. For example, the process can enable two optical switches (e.g., the optical switches 346A and 350A illustrated in FIG. 3) to open a path from a polarization splitter (e.g., the polarization splitter 344 illustrated in FIG. 3) to a polarization rotator (e.g., the polarization rotator 348A illustrated in FIG. 3).

In an embodiment, the process enables four optical switches (e.g., the optical switches 346A, 350A and 346B, 350B) to open paths to two polarization rotators (e.g., the polarization rotators 348A and 348B) simultaneously. Alternatively, or in addition, the process enables two optical switches (e.g., the optical switch 346A and 350A) and one polarization rotator (e.g., the polarization rotator 348A) at a time, then disables that two optical switches and enables two other optical switches (e.g., the optical switches 346B and 350B) and another polarization rotator (e.g., the polarization rotator 348B).

At block 604 the process sweeps the VOAs (e.g., the VOAs 352A and 352B) across a suitable range of attenuation values. At block 606, the process creates a table of attenuation values for the VOAs. At block 608, the process sets the VOAs to a default setpoint. At block 610, the process calibrates the receiver VOAs (e.g., the VOAs 352A and 352B). For example, the process can compare RSSI values indicated at an optical receiver device (e.g., the receiver device 332 illustrated in FIG. 3) with a received power level (e.g., IPMON illustrated in FIG. 3). This can be used to populate the table of attenuation values for the VOAs. The table of attenuation values can then be used during operation of the optical system.

Figure 7:
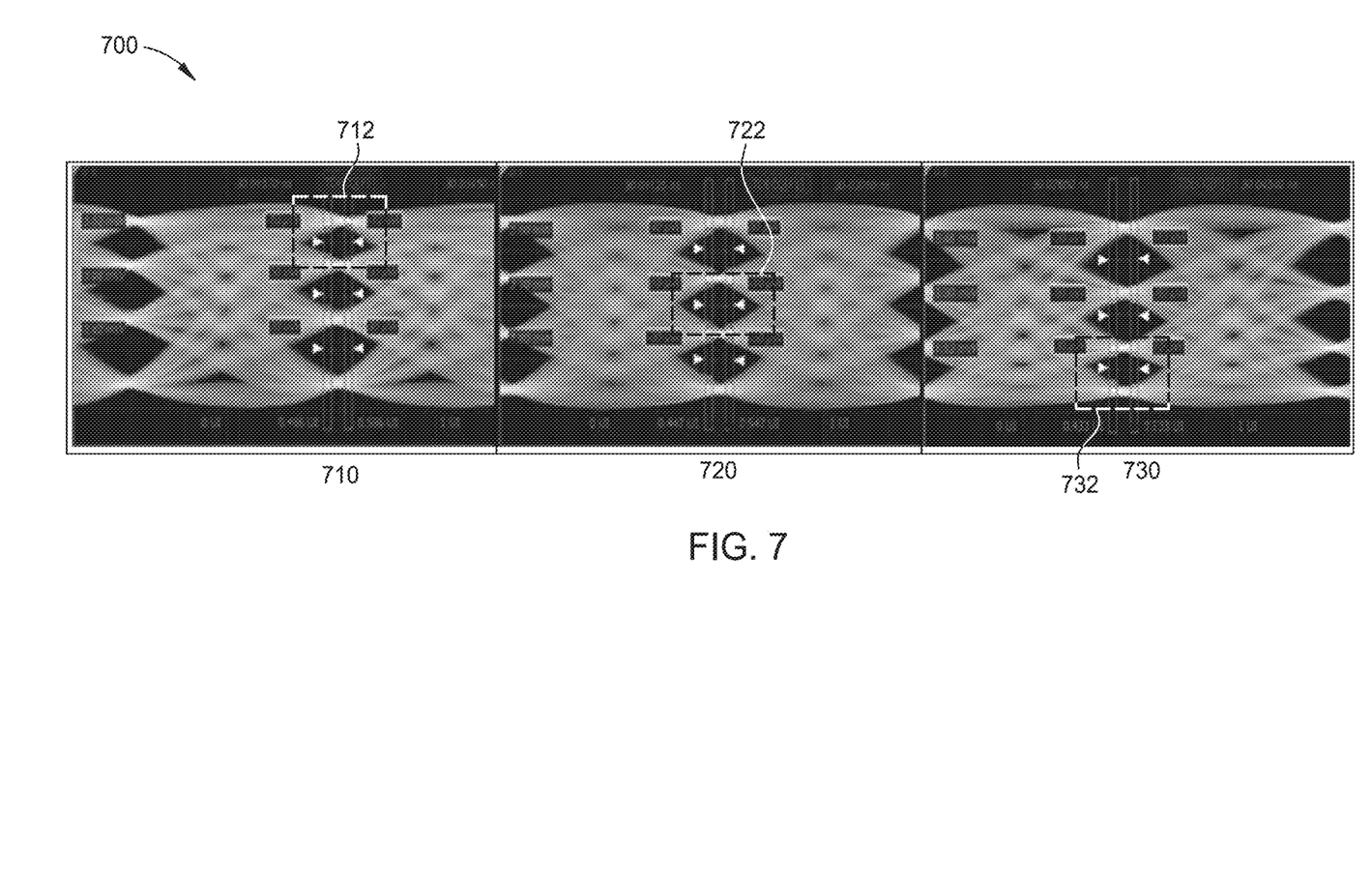
FIG. 7 illustrates compression schemes for modulation in an optical communication system, according to an embodiment.

FIG. 7 illustrates compression schemes for modulation in an optical communication system, according to an embodiment. In an embodiment, the auto-tuning techniques described in relation to FIGS. 3-6 can also be used to set compression for modulation. For example, auto-tuning can be used to set a modulator (e.g., the modulator 310 illustrated in FIG. 3) using PAM4 modulation to use a bottom compression scheme. This can significantly improve the return loss robustness of the optical communication system (e.g., lessening the multi-path interference (MPI)).

The diagram 700 depicts two compression schemes for PAM4 modulation. Illustration 710 shows a top-compression scheme, in which a top "eye" 712 of the modulation scheme is compressed as compared to the "uniform case" 720 eyes in the scheme. Illustration 720 shows a uniform scheme, in which the middle eye 722 is uniform as compared to the other eyes in the scheme. Illustration 730 shows a bottom compression scheme, in which a bottom eye 732 is compressed as compared to the other eyes in the scheme.

Typically, many optical systems use a uniform or middle compression scheme (e.g., as shown in illustration 720). Using a bottom compression scheme, however, as shown in illustration 730, can be beneficial. One or more of the auto-tuning techniques described in relation to FIGS. 3-6 can be used to enable and tune such a bottom compression scheme for PAM4 modulation.

For example, a modulator (e.g., the modulator 310 illustrated in FIG. 3) can be set to quadrature, and optical loopback (e.g., using the loopback cable 320 illustrated in FIG. 3) can be used to connect a transmission fiber (e.g., the transmission fiber 316 illustrated in FIG. 3) with a receiver fiber (e.g., the receiver fiber 340 illustrated in FIG. 3). A digital signal processor (DSP) can be provisioned to send a balanced pattern (e.g.; a pseudorandom binary sequence (PRBS)) from the transmitter to the receiver. The DSP can retrieve histograms of the four levels constituting the PAM4 eye. The modulator can be changed in fine steps to enable a bottom compression scheme. Further, the level separation mismatch ratio ($R_{LM}$) can be managed.

Figure 8:
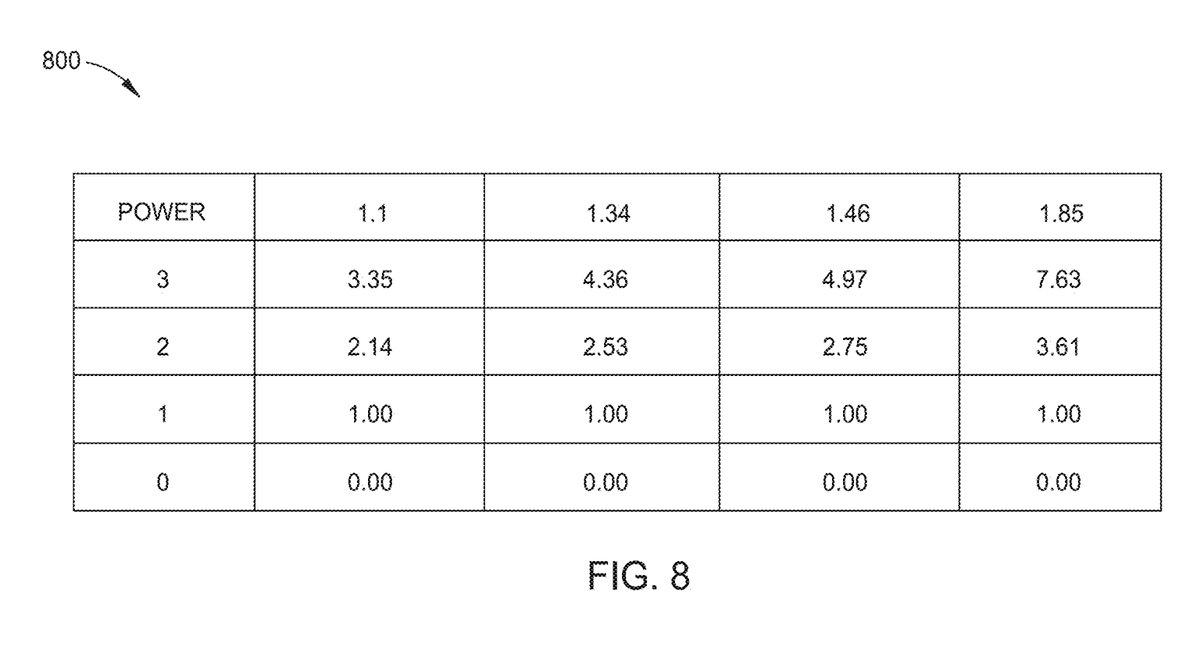
FIG. 8 illustrates power level ratios for a level separation mismatch ratio used for modulation in an optical communication system, according to an embodiment.

FIG. 8 illustrates power level ratios used for modulation in an optical communication system, according to an embodiment. In an embodiment, an optical communication system can use PAM4 modulation. $R_{LM}$ can be used to indicate vertical linearity of PAM4 modulation signal. The table 800 illustrates example power level ratio values for an example 1.1, 1.34, 1.46, and 1.85 scheme. In an embodiment, these power level ratio values can provide improved performance. The auto-tuning techniques discussed in relation to FIGS. 3-6, above, can be used to configure a production optical communication system to use the power level ratio values illustrated in the table 800.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    enabling a first tuning mode for an optical communication system, the optical communication system comprising:
        a first signal path for transmitting data, comprising:
            an optical source;
            a first one or more variable optical attenuators (VOAs):
            a modulator; and
            a transmission fiber; and
        a second signal path for receiving data comprising:
            a receiver fiber; and
            a second one more VOAs;
    tuning the first one or more VOAs, using the optical source in the first signal path for transmitting data, based on comparing a plurality of optical signal power values in the first path while the first tuning mode is enabled;
    enabling a second tuning mode for the optical communication system;
    tuning the second one or more VOAs, using the optical source in the first signal path for transmitting data, based on comparing a plurality of optical signal power values in the second path while the second tuning mode is enabled; and
    enabling a communication mode wherein the optical communication system is configured to use the first signal path for transmitting data and the second signal path for receiving data.

2. The method of claim 1, wherein enabling the first tuning mode comprises changing a first one or more optical switches in the optical communication system.

3. The method of claim 2, wherein enabling the second tuning mode comprises changing a second one or more optical switches in the optical communication system.

4. The method of claim 1, wherein the second signal path comprises a polarization splitter, and wherein enabling the second tuning mode comprises enabling a third signal path comprising a plurality of polarization rotators.

5. The method of claim 4, wherein tuning the second one or more VOAs comprises using at least one polarization rotator, of the plurality of polarization rotators, to rotate a polarization component of an optical signal received from the receiver fiber.

6. The method of claim 4, wherein the polarization splitter is configured to divide an optical signal received from the receiver fiber into a transverse electric (TE) polarization and a transverse magnetic (TM) polarization, and wherein a first polarization rotator of the plurality of polarization rotators is configured to rotate the TE polarization and a second polarization rotator of the plurality of polarization rotators is configured to rotate the TM polarization.

7. The method of claim 1, further comprising tuning the modulator while the first tuning mode is enabled.

8. The method of claim 1, wherein tuning the first one or more VOAs comprises comparing a first optical signal power value indicated in the first signal path before the one or more VOAs with a second optical signal power value indicated in the first signal path after the one or more VOAs.

9. The method of claim 1, wherein the modulator comprises a pulse amplitude modulation (PAM) modulator, the method further comprising setting the modulator to use bottom compression.

10. The method of claim 9, further comprising tuning the modulator to use bottom compression while the first tuning mode is enabled.

11. The method of claim 1, wherein tuning the first one or more VOAs and tuning the second one or more VOAs each comprises storing a respective plurality of tuning values in a table in a non-volatile media.

12. An optical communication system, comprising:
a first signal path for transmitting data, comprising:
an optical source;
a first one or more variable optical attenuators (VOAs);
a modulator; and
a transmission fiber; and
a second signal path for receiving data comprising:
a receiver fiber; and
a second one more VOAs;
wherein the optical communication system is configured to:
enable a first tuning mode for tuning the first one or more VOAs, using the optical source in the first signal path for transmitting data, based on comparing a plurality of optical signal power values in the first path while the first tuning mode is enabled;
enable a second tuning mode for tuning the second one or more VOAs, using the optical source in the first signal path for transmitting data, based on comparing a plurality of optical signal power values in the second path while the second tuning mode is enabled; and
enable a communication mode wherein the optical communication system is configured to use the first signal path for transmitting data and the second signal path for receiving data.

13. The optical communication system of claim 12, wherein the first tuning mode is configured to be enabled by changing a first one or more optical switches in the optical communication system, and wherein the second tuning mode is configured to be enabled by changing a second one or more optical switches in the optical communication system.

14. The optical communication system of claim 12, wherein the second signal path comprises a polarization splitter, wherein enabling the second tuning mode comprises enabling a third signal path comprising a plurality of polarization rotators, and wherein the second one or more VOAs are configured to be tuned using at least one polarization rotator, of the plurality of polarization rotators, to rotate a polarization component of an optical signal received from the receiver fiber.

15. The optical communication system of claim 14, wherein the polarization splitter is configured to divide an optical signal received from the receiver fiber into a transverse electric (TE) polarization and a transverse magnetic (TM) polarization, and wherein a first polarization rotator of the plurality of polarization rotators is configured to rotate the TE polarization and a second polarization rotator of the plurality of polarization rotators is configured to rotate the TM polarization.

16. The optical communication system of claim 12, wherein the optical communication system is further configured to tune the modulator while the first tuning mode is enabled.

17. The optical communication system of claim 12, wherein the modulator comprises a pulse amplitude modulation (PAM) modulator, and wherein the modulator is configured to use bottom compression.

18. A method, comprising:
transmitting data using a first signal path in an optical communication system, the first signal path comprising:
an optical source;
a first one or more variable optical attenuators (VOAs);
a modulator; and
a transmission fiber;
receiving data using a second signal path in the optical communication system, the second signal path comprising:
a receiver fiber; and
a second one more VOAs;
wherein the first one or more VOAs are configured to be tuned, using the optical source in the first signal path, based on comparing a plurality of optical signal power values in the first path while a first tuning mode is enabled, and
wherein the second one or more VOAs are configured to be tuned, using the optical source in the first signal path, based on comparing a plurality of optical signal power values in the second path while a second tuning mode is enabled.

19. The method of claim 18, wherein the optical communication is configured to enable the first tuning mode by changing a first one or more optical switches, and wherein the optical communication is configured to enable the second tuning mode by changing a second one or more optical switches.

20. The method of claim 18, wherein the second signal path comprises a polarization splitter, wherein enabling the second tuning mode comprises enabling a third signal path comprising a plurality of polarization rotators, and wherein the second one or more VOAs are configured to be tuned using at least one polarization rotator, of the plurality of polarization rotators, to rotate a polarization component of an optical signal received from the receiver fiber.

* * * * *

UNITED STATES PATENT AND TRADEMARK OFFICE
CERTIFICATE OF CORRECTION

| | |
|---|---|
| PATENT NO. | : 11,296,791 B1 |
| APPLICATION NO. | : 17/062289 |
| DATED | : April 5, 2022 |
| INVENTOR(S) | : Marco Mazzini et al. |

It is certified that error appears in the above-identified patent and that said Letters Patent is hereby corrected as shown below:

On the Title Page

Item (57), in Column 2, in "Abstract", Line 7, delete "one more" and insert -- one or more --.

In the Specification

In Column 2, Line 5, delete "one more" and insert -- one or more --.

In Column 2, Line 27, delete "one more" and insert -- one or more --.

In Column 2, Line 50, delete "one more" and insert -- one or more --.

In Column 5, Line 37, delete "strength (RSSI)" and insert -- strength indication (RSSI) --.

In Column 7, Line 5, delete "(e.g.;" and insert -- (e.g., --.

In Column 7, Line 24, delete "TM)," and insert -- TM). --.

In Column 9, Line 42, delete "604" and insert -- 604, --.

In Column 10, Line 21, delete "(e.g.;" and insert -- (e.g., --.

In the Claims

In Column 12, Line 12 (Approx.), in Claim 1, delete "(VOAs):" and insert -- (VOAs); --.

In Column 12, Line 17, in Claim 1, delete "one more" and insert -- one or more --.

Signed and Sealed this
Twenty-seventh Day of December, 2022

Katherine Kelly Vidal
*Director of the United States Patent and Trademark Office*

CERTIFICATE OF CORRECTION (continued)
U.S. Pat. No. 11,296,791 B1

In Column 13, Line 16, in Claim 12, delete "one more" and insert -- one or more --.

In Column 14, Line 27, in Claim 18, delete "one more" and insert -- one or more --.